United States Patent [19]

Gebel et al.

[11] 4,176,461
[45] Dec. 4, 1979

[54] DEVICE FOR MEASURING THE DEVIATION OF OBJECT WITH NOMINALLY CIRCULAR CROSS-SECTION FROM THE ROUND SHAPE

[75] Inventors: Iosif D. Gebel; Arkady A. Zykov; Askold I. Nefedov; Viktor I. Parshikov; Viktor F. Khrolenko, all of Leningrad, U.S.S.R.

[73] Assignee: Spetsialnoe Knostruktorskoe Bjuro PO Proektirovaniju Shlifovalnogo Oborudovania, Leningrad, U.S.S.R.

[21] Appl. No.: 657,688

[22] Filed: Feb. 12, 1976

Related U.S. Application Data

[63] Continuation-in-part of Ser. No. 466,889, May 3, 1974, Pat. No. 3,942,253.

[51] Int. Cl.² ............................ G01B 5/20; G01B 5/28
[52] U.S. Cl. ............................ 33/178 D; 33/174 PA
[58] Field of Search .......... 33/174 R, 174 L, 174 PA, 33/174 Q, 178 R, 178 D, 178 E

[56] References Cited

U.S. PATENT DOCUMENTS

| 3,274,693 | 9/1966 | Witzke | 33/178 D |
| 3,795,055 | 3/1974 | Zucco | 33/174 Q |
| 3,942,253 | 3/1976 | Gebel et al. | 33/174 PA |

FOREIGN PATENT DOCUMENTS

| 1944605 | 5/1971 | Fed. Rep. of Germany | 33/174 PA |
| 142789 | 8/1953 | Sweden | 33/178 D |

Primary Examiner—Richard R. Stearns
Attorney, Agent, or Firm—Haseltine, Lake & Waters

[57] ABSTRACT

The device has a base mounting a support which constantly contacts the surface of an object being measured, the object having a nominally circular cross-section. The support is a plurality of essentially self-adjusting balance beams arranged in steps or in a staggered order. The swing axles of the balance beams of a first step are secured to the base, while the swing axles of the balance beams of a subsequent step are secured to the ends of the balance beams of a preceding step. The balance beams of a last-in-succession step contact the profile of the cross-section of the object being measured. The central angles at which the balance beams are mounted are chosen on the basis of a condition of maximal stabilization of the position of the center of the profile of the cross-section of the object being measured relative to the base in the direction of the disposition of a sensing element of a displacement transducer secured to the base.

4 Claims, 13 Drawing Figures

DEVICE FOR MEASURING THE DEVIATION OF OBJECT WITH NOMINALLY CIRCULAR CROSS-SECTION FROM THE ROUND SHAPE

The present specification is a continuation-in-part of the previous application Ser. No. 466,889, filed May 3, 1974, for an invention titled "Device for Measuring Deviation of the Normal Section Profile of a Part from the Round Shape", U.S. Pat. No. 3,942,253 of Mar. 9, 1976.

FIELD OF USE OF INVENTION

The present invention relates to the field of measuring techniques and, more particularly, to devices used for measuring the deviation of an object with nominally circular cross-section from the round shape.

SHORTCOMINGS OF PRIOR ART

Devices for measuring the radial deviation of an object with nominally circular cross-section are well known and comprise a base mounting a support which is essentially a V-shaped prism contacting at two points the object being measured. The same base has a displacement transducer disposed thereon having its sensing element contacting the profile of the object being measured.

The main shortcoming of such devices lies in an extremely low accuracy of measurement of the deviation of the shape. This known method is limited to situations wherein a single lobing condition is present and the number of the lobes is predetermined. Complex lobing conditions, however, cannot be satisfactorily measured according to this known method, nor indeed can simple lobing conditions be measured unless the type of a condition can be predetermined.

A device incorporating two V-shaped prisms is disclosed in U.S. Pat. No. 3,724,693. This device comprises two V-shaped prisms for engaging the object being measured, each one of the prisms having a different predetermined included angle, two transducer means associated, respectively, with each one of the prisms and a computer which is suitably programmed to provide an output indicative of the radial deviation of the periphery of the object being measured. The accuracy offered by the last-mentioned device with the two V-shaped prisms is higher than that of the device with a single V-shaped prism; however, the last-mentioned device is not free either from certain drawbacks, e.g. it does not enable to measure with a sufficient accuracy the deviation of an object having an arbitrary cross-section.

There are further known devices for measuring non-circularity, e.g. those disclosed in the German Application Ser. No. 1,944,605. One of these devices includes a yoke bearing upon the surface of the object being measured by two prisms pivotally connected to this yoke and a displacement transducer mounted on this yoke intermediate the two bearing prisms.

Another device disclosed in the German Application includes a yoke bearing on the surface of the object being measured by two groups of bearing members, a displacement transducer arranged intermediate the two groups of bearing members, each group being in the form of two prisms. Each pair of the prisms is connected with the aid of rods with a bell crank pivotally mounted on the yoke. The last-described device enables one to measure with an adequate accuracy the radial deviations of objects being measured, provided necessarily, that the parameters of the device are properly selected. A disadvantage of this device is its relatively complicated structure, and the great number of the components and kinematic couples, which as it is commonly known, significantly affects the accuracy that can be practically attained, and also affects the reliability and stability of the performance, to say nothing of the cost of manufacture of the device being increased.

Furthermore, widely known in the art are devices used for measuring the radial deviation of an object with nominally circular cross-section, comprising a precision spindle mounting a transducer, the sensing element of the latter contacting the periphery of the object being inspected.

This device enables one to measure the deviations of objects with nominally circular cross-section from the round shape with a high accuracy.

The accuracy of the measurements carried out with the aid of the last-specified device is ensured due to a high stability of the position of the axis of rotation of the spindle. The stability of the position of the axis is attained owing to a high precision of manufacture of all parts of the spindle, which makes these devices extremely costly and requires a high skill of the personnel servicing them. There is also a limitation put on the size and weight of an object which can be measured by this technique, and it is impossible to measure the objects in situ or while mounted in a machine tool.

OBJECTS AND BRIEF DESCRIPTION OF PRESENT INVENTION

An object of the present invention is to provide a device to measure the radial deviation of an object with a high degree of accuracy.

Another object of the present invention is to provide a device for measuring the radial deviation of objects whose lobing or out-of-roundness characteristics are unknown prior to measurement.

It is a further object of the present invention to provide a device for measuring the radial deviation of objects, which is simple in design, relatively inexpensive to manufacture, reliable in operation and which has a high degree of stability and low maintenance requirements.

It is yet another object of the present invention to provide a device for measuring the radial deviation of an object in situ or while mounted in a machine tool.

It is a still further object of the present invention to provide a device for measuring the radial deviations of objects of comparatively large sizes and weights.

Still another object of the present invention is to provide a device for measuring the radial deviation of objects, in which the measurement may be simply indicated by means of an indicator gauge, without the incorporation of an electronic apparatus.

It is a further object of the present invention to provide a device for measuring the radial deviations of objects, which by means of an additional transducer is capable of indicating the distance between the centre of the profile of the cross-section of the object being measured and the axis of its rotation.

These and other objects and advantages of the present invention will become readily apparent from the following detailed description taken in connection with the appended drawings to which more detailed reference will be had somewhat later.

The abovesaid and other objects of the present invention are accomplished by means of a device for measuring the deviation of an object with nominally circular cross-section from the round shape, comprising a base, a displacement transducer secured to the base and including a sensing element adapted to contact the surface of the object to be measured; a device adapted to visualize the response of the transducer; a support device mounted on the base and consisting of self-abjusting balance beams mounted to pivot about their respective swing axles arranged in a plurality of support steps including at least the first step and the last step, each step except the last step being the next preceding step, for some other step and each step except the first step being the next subsequent step for some other step, the swing axles of the balance beams of the first step being secured directly to the base, the swing axles of the balance beams of each step except the first step being secured directly to the respective ends of the beams of the next preceding step, and the beams of the last step having areas adapted to contact the surface of the object to be measured.

The disposition of the swing axles of the beams of said first step on the base is determined by central angles defined by radii drawn from the centre of relative rotation of the object being measured to the swing axle of the respective beam of the first step and to the middle of the segment interconnecting the swing axles of the beams of the first step. The disposition of the swing axles of the beams of each subsequent step on the beams of the next preceding step is determined by central angles defined by radii drawn from the centre of relative rotation of the object being measured to the swing axles of the beam of the next preceding step and the respective beam of the next subsequent step installed thereon. The disposition of each of the surface of the object to be measured is determined by central angles defined by radii drawn from the centre of relative rotation of the object being measured to the swing axle of the respective beam of the last step and to the middle of the area situated thereon.

The disposition of the transducer on the base is determined by a central angle defined by radii drawn from the centre of relative rotation of the object being measured to the point at which the sensing element of the transducer contacts the surface of the object to be measured and to the middle of the segment interconnecting the swing axles of the beams of the first step. All central angles are chosen on the basis of the condition of maximal stabilization of the portion of the centre of the profile of the cross-section of the profile of the object being measured in the direction of a straight line passing through the centre of relative rotation of the object being measured and to the point at which the sensing element of the transducer contacts the surface of the object being measured.

In case the balance beams are made symmetrical relative to the plane passing through its respective swing axle and the centre of relative rotation of the object being measured, and the pair of the beams of each step except the first step is symmetrical relative to the plane passing through the swing axle of the respective beam of the next preceding step and the centre of relative rotation of the object being measured, and the sensing element of the transducer contacts the surface of the object to be measured at a point belonging to the straight line passing through the centre of relative rotation of the object being measured and parallel with the plane drawn through the swing axles of the beams of the first step, it is expedient to define the central angles on the basis of the condition of minimizing the expression: wherein:

$$P_{yn} = \left| \frac{\sin n\mu_o}{\sin \mu_o} \prod_{i=1}^{i=k} \frac{\cos n\mu_i}{\cos \mu_i} \right|,$$

$P_{yn}$ is a value determining the amplitude of the harmonic n of displacement of the centre of the profile of the cross-section of the object being measured in the direction of the disposition of the sensing element of the transducer;

n is a serial number of harmonic, n=2; 3; 4; . . . ;

$\mu_o$ is a central angle defined by radii drawn from the centre of relative rotation of the object being measured to the swing axles of one of the beams of the first step and to the middle of a segment interconnecting the swing axles of the beams of the first step;

i is a serial number of the step of the self-adjusting supports, $1 \leq i \leq k$;

$\mu_i$ is a central angle defined by radii drawn from the centre of relative rotation of the object being measured to the swing axles of one of the beams of the step i and one of the beams of the step i+1, mounted thereon, with i=k, to the middle of the area of the contact of one of the beams of the last step with the surface of the object to be measured and the swing axle of the one beam of the last step, and is a symbol that stands for the product of the cofactors ranging from i=1 to 1=k.

In a modification of the device all the central angles may be chosen on the basis of the condition of maximal stabilization of the position of the centre of the profile of the cross-section of the object being measured in the direction of the straight line passing through the centre of relative rotation of the object being measured and perpendicular to the plane drawn including through the swing axles of the beams of the first step, the sensing element of the transducer contacting the surface of the object to be measured at a point belonging to the straight line.

In the just described modification, if the balance beams are symmetrical relative to the plane passing including through the respective swing axle of the beam and the centre of relative rotation of the object being measured, and the pair of the beams of each step except the first step is symmetrical relative to the plane passing including through the swing axle of the respective beam of the next preceding step and the centre of relative rotation of the object being measured, it is expedient to define all the central angles on the basis of the condition of minimizing the expression $$P_{xn} = \left| \frac{\cos n\mu_o}{\cos \mu_o} \prod_{i=1}^{i=k} \frac{\cos n\mu_i}{\cos \mu_i} \right|$$

wherein $P_{xn}$ is a value determining the amplitude of the harmonic n of the displacement of the centre of the profile of the cross-section being measured in the direction of the straight line passing through the centre of relative rotation of the object being measured and perpendicular to the plane drawn through the swing axles of the beams of the first step, all the other designations being as explained hereinabove.

The disposition of the balance beams at predetermined angles chosen on the basis of the condition of minimizing the aforegiven expressions provides for a high stability of the position of the centre of the profile of the cross-section of the object being measured in the direction of the disposition of the sensing element of the displacement transducer.

In case the device is used for measuring the distance between the centre of the profile of the cross-section of the object being measured and the axis of its rotation, it is expedient to suspend the base carrying the self-adjusting balance beams from a pantograph and to install an additional transducer disposed in such a manner that its sensing element contacts the flat portion of the base in a direction perpendicular to the translational displacement of the base.

With the base disposed on the pantograph and the additional transducer incorporated, it is possible to measure simultaneously the deviation of the object with nominally circular cross-section from the round shape and the distance between the centre of the profile of the cross-section of the object and its actual axis of rotation, i.e. the run-out.

The device for measuring the radial deviation of the object being measured, built in accordance with the present invention, provides for a high accuracy of measurements and is relatively simple in design. Besides, this device does not require a high skill on the operating personnel's part and can be installed in workshops where the objects to be inspected are produced.

BRIEF DESCRIPTION OF THE DRAWINGS

The following description of the specific exemplary embodiments of the present invention is given with reference to the accompanying drawings, wherein.

DETAILED DESCRIPTION OF EMBODIMENTS

The inventive, exemplary device for measuring the deviation of a shaft 1 (FIGS. 1, 2) from the round shape has a base 2 mounting a support 3 which is essentially in the form of self-adjusting balance beams 4 and 5 arranged in steps. The balance beams 4 form a first step of the support, their swing axles 6 being secured to the base 2. Secured to the end portions of each balance beam 4 of the first step are swing axles 7 of the balance beams 5 forming a second step of the support.

The balance beams 5 of the second step have areas 8 (FIG. 3) adapted to contact the profile of the shaft 1 being measured. In a particular case a point contact is possible, i.e. when the areas of the contact have no lengths. The base 2 mounts a transducer 9 (FIGS. 1 and 2), a sensing element 10, hereinafter being referred to as "the feeler", of the transducer 9 touching the profile of the shaft 1 which is to be measured.

The output of the displacement transducer may be connected to a meter or other suitable visual indication means, it may also be connected to a recording device which is not shown for the clarity's sake.

Figure 1:
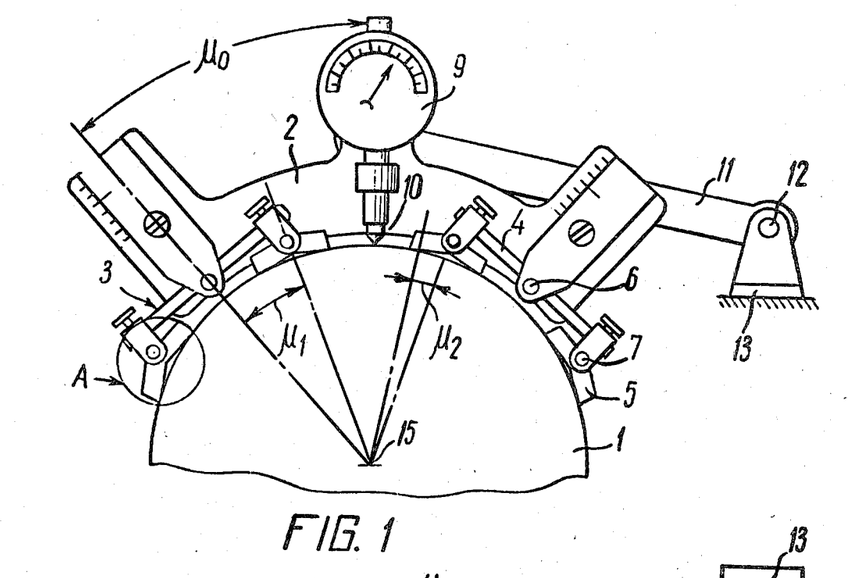
FIG. 1 shows a particular, preferred, exemplary embodiment of the device for measuring the deviation of in a shaft from the round shape, a front view.
Figure 2:
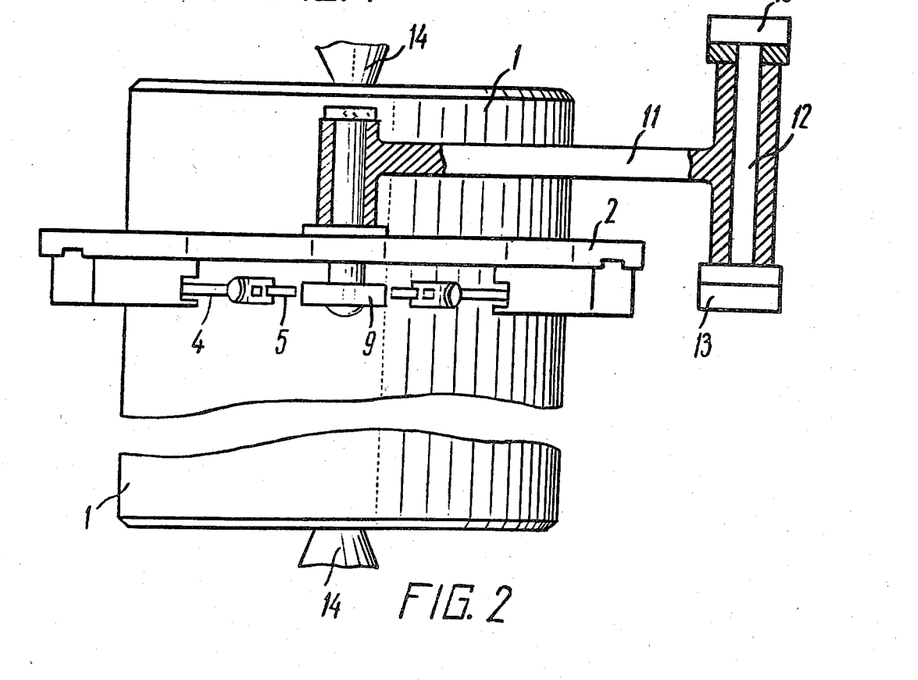
FIG. 2 shows the same device in a plan view.

The base 2 is pivoted to the end portion of a lever 11 of which a pivot pin 12 is secured in a bracket 13.

The lever 11 is utilized to retain the base 2 in a required position relative to the profile being measured, the constant contact of the balance beams 5 of the last step with the profile being measured being ensured by the weight of the balance beams 4, 5 and of the base 2.

Alternatively, to urge the balance beams 5 against the shaft 1, a spring or any other elastic member may be used.

The shaft 1 is mounted in centers 14 and is rotatable by a drive which is not shown, also for clarity's sake.

The position of the swing axle 6 of each balance beam 4 of the first step is determined by a central angle $\mu_o$ defined by radii, drawn from a centre 15 of the profile of the cross-section being measured, which coincides with the centre of relative rotation of the shaft 1, to the axle 6 and to the middle of the segment interconnecting the axles 6 of the balance beam 4 of the first step.

The position of the swing axle 7 of each balance beam 5 of the second step is determined by a central angle $\mu_1$ defined by radii drawn from the centre 15 to the axles 6 and 7.

The position of each contact area 8 of each balance beam 5 of the second step with the profile of the shaft 1 is determined by a central angle $\mu_2$ defined by radii drawn from the centre 15 to the swing axle 7 of the respective balance beam and to the middle of this area of contact.

The position of the feeler 10 of the transducer 9 is determined by an angle $\alpha$ (FIG. 4) defined by radii drawn from the centre 15 to the feeler 10 and to the middle of the imaginary segment interconnecting the axles 6 of the balance beams of the first step.

In the device shown in FIG. 1 the angle $\alpha$ equals zero, since the feeler 10 is disposed on the radius passing through the middle of the segment interconnecting the swing axles 6.

For the cases when $\alpha=0°$ or when $\alpha=180°$, these central angles $\mu_o$, $\mu_1$, $\mu_2$ are chosen on the basis of the condition of maximal stabilization of the position of the centre 15 of the profile of the cross-section of the shaft 1 relative to the base 2 in the direction of the disposition of the feeler 10.

The minimum of the following expression corresponds to the condition of the maximal stabilization of this centre 15 of the shaft 1 relative to the base 2 in the direction $\alpha=0°$ or $\alpha=180°$:

$$P_{xn} = |(\cos n\mu_o/\cos \mu_o)\cdot(\cos n\mu_1/\cos \mu_1)\cdot(\cos n\mu_2/\cos \mu_2)|,$$

wherein $P_{xn}$ is the value determining the amplitude of the n-th harmonic of the displacement of the centre 15 in the direction of the displacement of the centre 15 in the direction of the disposition of the feeler 10 ($\alpha=0°$ or $\alpha=180°$);
the rest of the designations have been already described hereinabove.

In case the feeler 10 of the transducer touches the periphery of the shaft 1 at a point disposed on a radius extending parallel with an imaginary segment that interconnects the swing axles 6 of the balance beams 4 of the first step ($\alpha=\pm90°$), the central angles $\mu_o$, $\mu_1$, $\mu_2$ are chosen on the basis of the condition of the maximal stabilization of the position of the centre 15 of the profile of the cross-section of the shaft 1 relative to the base 2 in the direction of the disposition of the feeler 10, characterized by the angle $\alpha=\pm90°$.

The minimum of the following expression corresponds to the condition of the maximal stabilization of the position of the centre 15 of the shaft 1 relative to the base 2 in the direction $\alpha=\pm90°$:

$$P_{yn} = |(\sin n\mu_o/\sin \mu_o)\cdot(\cos n\mu_1/\cos \mu_1)\cdot(\cos n\mu_2/\cos \mu_2)|,$$

where $P_{yn}$ is the value determining the amplitude of the n-th harmonic of the displacement of the centre 15 in the direction of the disposition of the feeler 10 ($\alpha=\pm90°$).

In order to step up the accuracy of the measurement of the out-of-roundness of the an object (i.e. of non-circularity of the object), the number of the successive steps of the self-adjusting balance beams may be increased.

Figure 4:
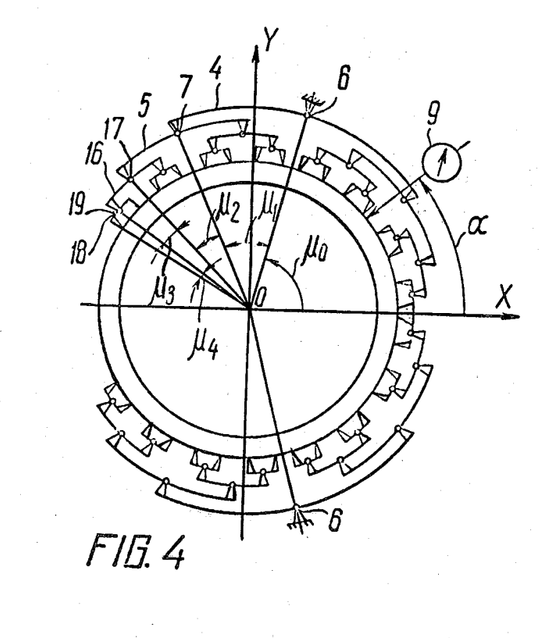
FIG. 4 shows schematically the general case of a symmetrical disposition of balance beams relative to their axles and to the axles of the balance beams of a preceding step, and an asymmetrical disposition of a displacement transducer.

FIG. 4 of the appended drawings shows a four-step support structure, wherein balance beams 16 of a third step are mounted on swing axles 17 which are secured to the ends of the balance beams 5 of the second step.

Balance beams 18 of a fourth steps of the support structure are mounted on swing axles 19 which are secured to the ends of the balance beams 16 of the third step, i.e. the swing axles of the balance beams of a subsequent step are secured to the ends of the balance beams of the preceding step.

The central angles $\mu_3$ and $\mu_4$ characterizing the disposition of the swing axles 17 and 19, respectively, of the balance beams 16 and 18, and the areas of the contact between the balance beams 18 of the fourth step and the profile being monitored, are determined by the corresponding radii in a manner similar to that described hereinabove in connection with the afore-explained embodiment.

In a general case, if the consecutive number of the i-th step of the support structure equals $1\leq i\leq k$, and $\alpha=0°$ or $180°$, the values of the angles $\mu_i$ are chosen on the basis of the condition of minimizing the value of:

$$P_{xn} = \left|\frac{\cos n\mu_o}{\cos \mu_o} \prod_{i=1}^{i=k} \frac{\cos n\mu_i}{\cos \mu_i}\right|$$

If the feeler 10 of the displacement transducer 9 touches the profile being monitored at points corresponding to angles $\alpha=\pm90°$, the values of the angles $\mu_i$ ($0\leq i\leq k$) are chosen on the basis of the condition of minimizing the value $$P_{yn} = \left|\frac{\sin n\mu_o}{\sin \mu_o} \prod_{i=1}^{i=k} \frac{\cos n\mu_i}{\cos \mu_i}\right|$$

With $\alpha=0°$ or $180°$, the angles $\mu_o=39°$, $\mu_1=20°$, $\mu_2=10°$ minimize the value $P_{xn}$, and in a device employing a two-step support, provide a cophasal measurement of the amplitudes of the harmonics of the Fourier's series of the profile being monitored, with serial numbers $2\leq n\leq 14$, and an error not exceeding 25%.

With $\alpha=0°$ or $180°$, the angles $\mu_o=39°$, $\mu_1=20°$, $\mu_2=10°$, $\mu_3=5°$ minimize the value $P_{xn}$, and in a device employing a three-step support, provide a cophasal measurement of the amplitudes of the harmonics of the Fourier's series of the profile being monitored, with serial numbers $2\leq n\leq 25$, and an error not exceeding 25%.

With $\alpha=\pm90°$, the angles $\mu_o=75°$, $\mu_1=39°$, $\mu_2=20°$, $\mu_3=10°$, $\mu_4=5°$ minimize the value $P_{yn}$, and in a device employing a four-step support, provide a cophasal measurement of the amplitudes of the harmonics of the Fourier's series of the profile being monitored, with serial numbers $2\leq n\leq 25$, and with an error not exceeding 8%, except the third harmonic for which the error of the measurement equals 17%.

There are also possible other satisfactory combinations of the angles.

Figure 5:
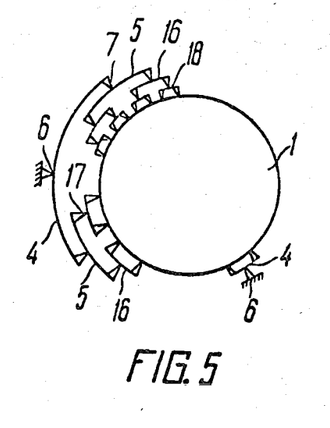
FIG. 5 shows schematically the general case of an asymmetrical disposition of the balance beams.

It is also possible to mount the balance beams 4, 5, 16, 18 in a non-symmetrical manner, as is shown in FIG. 5. The disclosed device for measuring the out-of-roundness (non-circularity) of the external surface of a ring 20 (FIGS. 6, 7) comprises a frame 21 mounting a spindle 22. One end portion of the spindle 22 is connected via a gear train 23 with an electric motor 24, while the other end portion of the spindle has a table 25 secured thereon and used for mounting the ring 20 to be measured. The ring 20 is fixed on the table 25 by means of stops 26.

Secured to the frame 21 is an axle 27 mounting a lever 28 pivoted to a base 29 in a manner similar to that in which the base 2 (FIGS. 1, 2) is connected to the lever 11.

Disposed on the base 29 (FIGS. 6, 7) is a support 30 which is essentially formed by balance beams 31 and 32 which are arranged in steps and form, respectively, the first and the second steps. The balance beams are interconnected and mutually disposed in a manner analogous to that in the device for measuring the out-of-roundness of the shaft 1 (FIGS. 1, 2).

Figure 6:
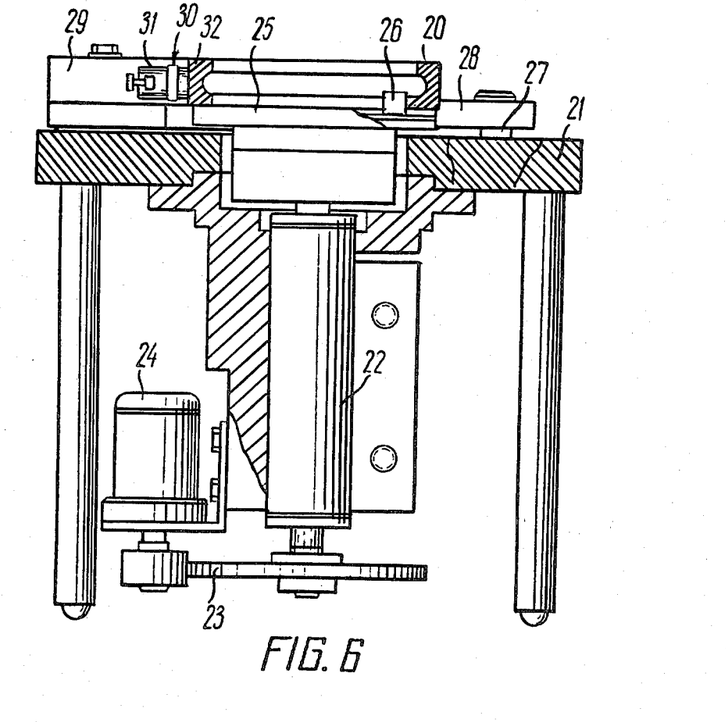
FIG. 6 shows a device for measuring the deviation of an external surface of a ring from the round shape, in a longitudinal section.
Figure 7:
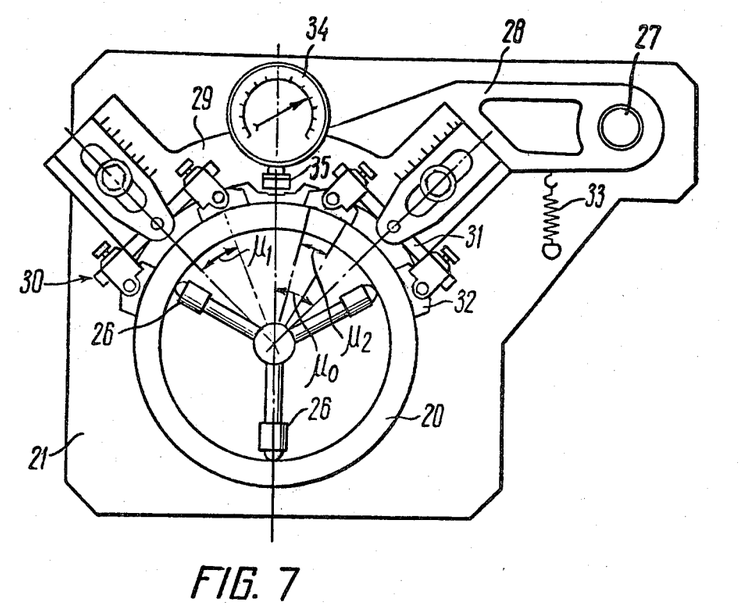
FIG. 7 is a plan view thereof.

A permanent contact effected by the balance beams 32 of the last step of the support is ensured by means of a spring 33 of which one end portion is secured to the lever 28 and the other end portion is fast with the frame 21.

A displacement transducer 34 is disposed on the base 29, its feeler 35 contacting the monitored profile of the ring 20.

The central angles $\mu_0$, $\mu_1$ and $\mu_2$ are found in a fashion identical to the one described hereinabove, depending on the angle $\alpha$ determining the position of the transducer 34 relative to the support 30.

Figure 8:
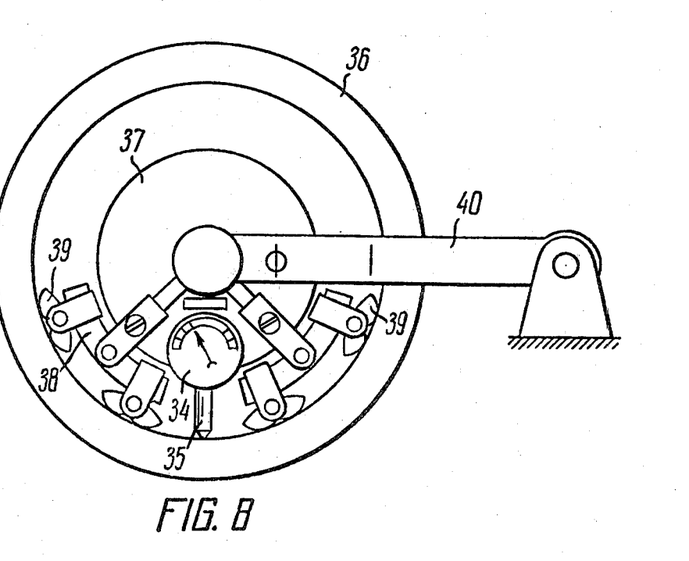
FIG. 8 shows a device for measuring the deviation of a hole in a part from the round shape.

In order to measure the out-of-roundness of the internal surface of a ring 36 (FIG. 8) or of some other workpiece having a round hole or bore, a base 37 and balance beams 38 and 39 mounted thereon are disposed on a lever 40 in a cantilever fashion, so that the base 37 can be introduced into the hole or bore being monitored.

In order to measure simultaneously the out-of-roundness of a shaft 41 (FIG. 9) and the distance between the centre "0" of the profile of the cross-section of the shaft 41 and the axis $0_1$ of rotation of the shaft, a base 42 and balance beams 43 and 44 mounted thereon are suspended from a pantograph 45 carried by a frame 46.

Figure 9:
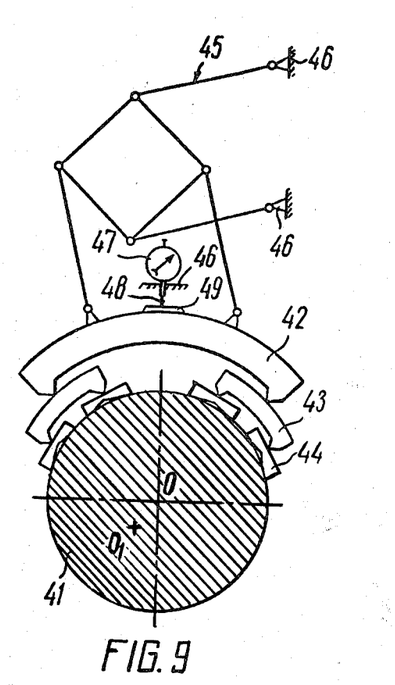
FIG. 9 shows a device for measuring the distance between the geometrical centre of the cross-section of a part and its axis of rotation, i.e. the run-out.

In order to measure the distance between the center "0" of the profile of the cross-section from the axis $0_1$ of rotation of the shaft 41, an additional transducer 47 is mounted on the frame 46, its feeler 48 touching the base 42, for which purpose the latter is provided with a flat portion 49.

The transducer 47 is mounted so that the feeler 48 is always displaced perpendicularly to the portion 49, which provides for the measurement of the deviation of the centre "0" of the profile of the cross-section from the axis $0_1$ of rotation of the shaft 41.

The displacement transducer measuring the deviation of the shaft 41 from the round shape is not shown in FIG. 9, it being understood that it is installed and functions in a manner identical with that described in connection with the afore-explained examples.

In order to measure the deviation of the centre "0" of the profile of the cross-section of the shaft 41 relative to the axis passing through the centres $0_1$ of the profiles of the cross-sections of base surfaces which are essentially the surfaces of journals 50 (FIGS. 10 and 11), the latter are mounted in a support which is essentially formed by self-adjusting balance beams 52, 53 mounted on a base 51 and arranged in steps.

Figure 10:
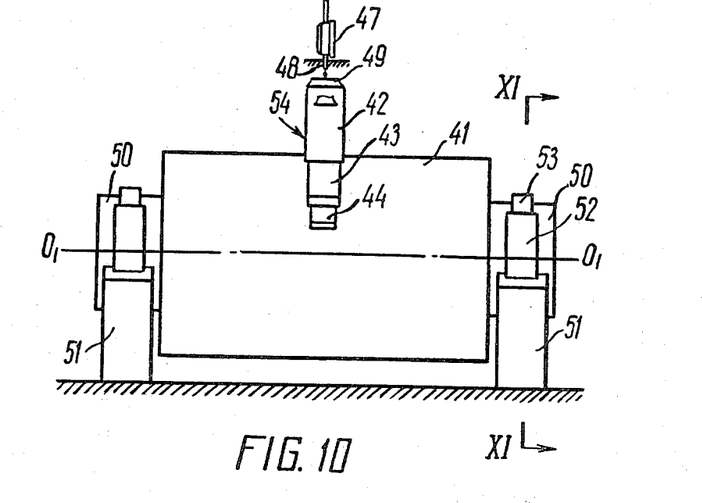
FIG. 10 is similar, for measuring the run-out of a monitored surface of a shaft relative to the journals whose cylindrical surfaces serve as base (reference) surfaces.
Figures 11, 12:
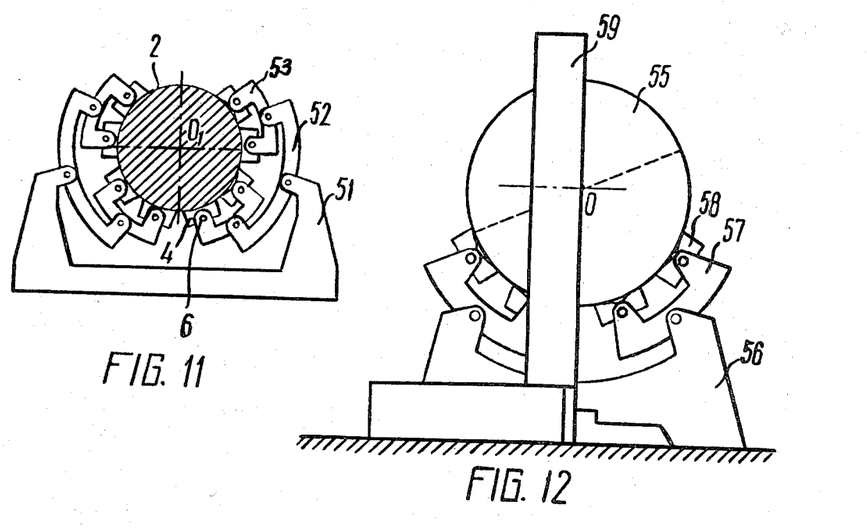
FIG. 11 is a sectional view taken on line XI—XI of FIG. 10.
FIG. 12 shows a device used for finding the centre of the profile of the cross-section of a part, i.e. a centredetector.

The design parameters of these supports are chosen on the basis of the condition of the stabilization of the position of the centres $0_1$ of each cross-section in a manner analogous to that described in connection with the afore-explained examples. A device 54 analogous to the one described hereinabove and illustrated in FIG. 9 is mounted on the monitored profile of the shaft 41.

The device for measuring the deviation from the round shape can also be used for finding the centre "0" (FIG. 12) of the profile of a part 55. For this purpose, there is secured a rule 59 to a base 56 mounting balance beams 57, 58 a, the rule replacing the transducer of the abovedescribed embodiments.

In order to find the centre "0" of the profile of the part 55, e.g. a forged piece, the latter is placed on the balance beams 57 in an arbitrary position. A line is drawn along the rule 59, whereafter the part 55 is rotated through a certain angle, e.g. 90°, and a second line is drawn in this position. The intersection of the lines shows the approximate position of the centre "0" of the profile of the part 55.

The device for measuring the deviation of an object with nominally circular cross-section from the round shape functions as follows. The shaft 1 (FIGS. 1, 2, 3) is imparted rotation. The base 2 and the balance beams 4 and 5 mounted thereon are lowered onto the shaft 1 until the portions 8 of the balance beams 5 contact the monitored profile of the shaft 1, whereby the feeler 10 of the transducer 9 engages or touches the profile being monitored.

Figure 3:
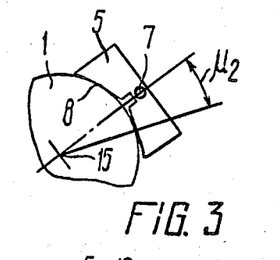
FIG. 3 shows an enlarged view of the area A in FIG. 1.

With the shaft 1 rotating, the balance beams 5 slide by their areas 8 along the surface of the shaft, which has microscopic recesses and lugs determining its deviation from the round shape.

The recesses and lugs of the profile of the shaft 1 cause swinging motions of the balance beams 4 and 5 about their respective axles 6 and 7, these swinging motions ensuring a permanent contact of all the areas 8 of the balance beams 5 with the monitored profile of the shaft 1, which is being measured.

With the swing axles 6, 7 of the balance beams 4, 5 mounted at the corresponding angles $\mu_0$, $\mu_1$ and $\mu_2$, there is provided a maximal stabilization of the distance from the centre 15 of the profile of the cross-section of the shaft 1 and the point at which the displacement transducer is secured to the base 2, irrespective of the out-of-roundness of the monitored profile of the shaft 1.

Stabilization of this distance provides for a high accuracy of the measurement of the deviation of the part with nominally circular cross-section from the round shape.

When measuring the out-of-roundness of the ring 20 (FIGS. 6, 7), the former is disposed and the table 25 which is rotated by the motor 24 through the gear train 23 and the spindle 22. Then the base 29 and the balance beams 31 and 32 mounted thereon are advanced to engage the surface of the ring 20, which is to be monitored.

The measurement of the deviation from the round shape is effected in a manner analogous to the one described hereinabove.

The measurement of the distance between the centre "0" of the profile of the cross-section of the shaft 41 (FIG. 10) and the axis $0_1$ of rotation of this shaft is carried out, as follows. During the rotation of the shaft 41 the distance between the flat portion 49 provided on the base 42 and the centre "0" of the profile of the cross-section of the shaft 41 is stabilized, owing to the action of the balance beams 43 and 44, as it has been described hereinabove in connection with the operation of the device shown in FIGS. 1 to 3. In case the shaft 41 rotates about the axis $0_1$ which does not coincide with the centre "0" of the shaft 41, this results in a displacement of the base 42 secured to the pantograph 45.

The feeler 48 of the transducer registers this displacement of the base 42, while the device (not shown) adapted to visualize the response of the transducer shows double the distance between the points "0" and $0_1$.

By having provided this device with two transducers, viz. one secured to the base 42 and the other one to the frame 46, it is possible to measure simultaneously the radial run-out of the shaft 41 and the distance between the geometrical centre "0" of the profile of the shaft and the axis $0_1-0_1$ of rotation of this shaft 41.

Figure 13:
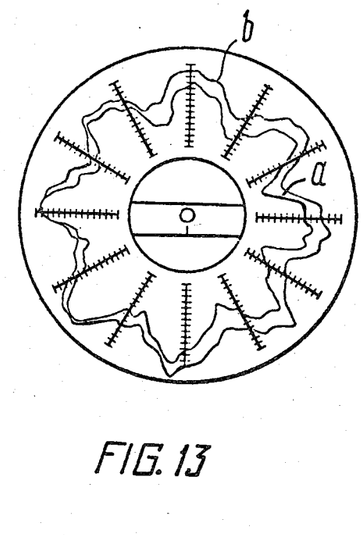
FIG. 13 shows comparative roundgrams obtained with the aid of the presently disclosed device and with the known "Talyrond" device.

FIG. 13 of the appended drawings presents the roundgrams of one and the same profile of the cross-section of a part, plotted, respectively, while measuring the deviation from the round shape with the aid of a device embodying the present invention (Curve "a") and while measuring this deviation with the aid of a "Talyrond" device marketed by Rank Taylor Hobson (Curve "b").

Both records are shown with 10,000 X enlargement. An analysis of the roundgrams shows that the actual measurement error pertaining to the device by the invention, as compared with that of the "Talyrond" device, is within approximately 0.2 to 0.3 micrometer.

A device for measuring the deviation of an object with nominally circular cross-section from the round shape, constructed in accordance with the present invention, helps solving an important and long-encountered problem, generally felt by the industry, of creating means for measuring the out-of-roundness or noncircularity of various objects, including such articles as rotor shafts of high-capacity turbines and generators, rolls of metal-rolling mills, calender rolls, etc., which could not be monitored for proper circularity by the hitherto existing means. A device embodying the present invention, although of a relatively simple structure and operation, enables to attain a high measuring accuracy.

The advantages of the presently disclosed device have been made possible by the novel design features thereof, of which the essential ones are the direct mounting of the balance beams of a subsequent step on those of the preceding step, the provision of at least two steps or stages of the support structure, the disposition of the displacement transducer in the direction of the stabilization of the position of the centre of the profile of the cross-section of the object being measured, as well as the optimization of the relative arrangement of the elements of the device.

Although the invention has been described in connection with particular exemplary embodiments, with various modifications thereof, it will be readily apparent to one skilled in the art that various changes may be made without departing from the spirit and scope of the invention.

What is claimed is:

1. A device for measuring the deviation of objects with nominally circular cross-sections from a round shape, comprising: a base; a displacement transducer secured to said base and including a sensing element for contacting the surface of the object to be measured; a device for visualizing the response of said transducer; a support device mounted on said base and including self-adjusting balance beams mounted to pivot about respective swing axles, arranged in a plurality of support steps, the latter including: at least a first step and a last step, each step except said last step being the preceding step for some other step, and each step except said first step being the subsequent step for some other step; said axles of said first step being directly secured to said base, said axles of said step except said first step being directly secured to respective ends of said beams of said preceding steps, and said beams of said last step having areas for contacting the surface of the object; the disposition of said axles of the first step being determined by central angles defined by radii drawn from a center of relative rotation of the object to said axle of the respective beam of said first step and to the middle of a segment interconnecting said axles of the first step; wherein said beams are symmetrical relative to a plane passing through their respective axles and said center of relative rotation, and a pair of beams of each step except said first step is symmetrical relative to said plane passing through said axle of the respective beam of said preceding step and said center of relative rotation; the disposition of said axles of two beams of each subsequent step of said preceding step being determined by central angles defined by radii drawn from said center of relative rotation to said axle of one of said beams of the preceding step and one of said axles of said subsequent step installed thereon; the disposition of said areas on the beams of said last step, contacting the surface of the object, being determined by central angles defined by radii drawn from said center of relative rotation to said axle of one of the beams of said last step and to the middle of one of said areas situated thereon; all of said central angles being determined on the basis of a condition of minimizing the expression $$P_{yn} = \left| \frac{\sin n\mu_o}{\sin \mu_o} \prod_{i=1}^{i=k} \frac{\cos n\mu_i}{\cos \mu_i} \right|$$

wherein: $P_{yn}$ is a value determining the amplitude of the harmonic n of displacement of the center of the profile of the cross-section of the object in a direction of a straight line passing through said center of relative rotation and parallel with a plane drawn through said axles of said first step;

n is a serial number of harmonics n=2; 3; 4;

$\mu_o$ is a central angle defined by radii drawn from said center of relative rotation to said axles of one of said beams of the first step and to the middle of a segment interconnecting said axles of the first step;

i is a serial number of the step of self-adjusting balance beams $1 \leq i \leq k$;

$\mu_i$ is a central angle defined by radii drawn from said center of relative rotation of said axles of one of said beams of the step i and one of said beams of the step i+1, mounted thereon, selectively with i=k, to the middle of an area adapted to contact one of said beams of the last step with the surface of the object and said axle of said one beam of the last step;

is a symbol that stands for the product of cofactors ranging from i=1 to i=k;

and wherein said sensing element contacts the surface of the object in a point on said straight line passing through said center of relative rotation and parallel with the plane drawn through said axles of said first step.

2. A device for measuring the deviation of objects with nominally circular cross-sections from a round shape, comprising: a base; a displacement transducer secured to said base and including a sensing element for contacting the surface of the object to be measured; a device for visualizing the response of said transducer; a support device mounted on said base and including at least two steps of self-adjusting balance beams mounted to pivot about respective swing axles; said axles of a first step being directly secured to said base, said axles of each step except said first step being directly secured to respective ends of said beams of the preceding steps, and said beams of a last step having areas for contacting the surface of the object; the disposition of said axles of the first step being determined by central angles defined by radii drawn from a center of relative rotation of the object to said axle of the respective beam of said first step and to the middle of a segment interconnecting said axles of the first step; wherein said beams are symmetrical relative to a plane passing through their respective axles and said center of relative rotation, and a pair of beams of each step except said first step is symmetrical relative to said plane passing through said axle of the respective beam of said preceding step and said center of relative rotation; the disposition of said axles of two beams of ech subsequent step of said preceding step being determined by central angles defined by radii drawn from said center of relative rotation to said axle of one of said beams of the preceding step and one of said axles of said subsequent step installed thereon; the disposition of said areas on the beams of said last step, contacting the surface of the object, being determined by central angles defined by radii drawn from said center of relative rotation to said axle of one of the beams of said last step and to the middle of one of said areas situated thereon; all of said central angles being determined on the basis of a condition of minimizing the expression $$P_{xn} = \left| \frac{\cos n\mu_o}{\cos \mu_o} \prod_{i=1}^{i=k} \frac{\cos n\mu_i}{\cos \mu_i} \right|$$

wherein: $P_{xn}$ is a value determining the amplitude of the harmonic n of displacement of the center of the profile of the cross-section of the object in a direction of a straight line passing through said center of relative rotation and perpendicular to a plane drawn through said axles of said first step;

n is a serial number of harmonics n=2; 3; 4;

$\mu_o$ is a central angle defined by radii drawn from said center of relative rotation to said axles of one of said beams of the first step and to the middle of a segment interconnecting said axles of the first step;

i is a serial number of the step of self-adjusting balance beams $1 \leq i \leq k$;

$\mu_i$ is a central angle defined by radii drawn from said center of relative rotation to said axles of one of said beams of the step i and one of said beams of the step i+1, mounted thereon, selectively with i=k, to the middle of an area adapted to contact one of said beams of the last step with the surface of the object and said axle of said one beam of the last step;

$$\prod_{i=1}^{i=k}$$

is a symbol that stands for the product of cofactors ranging from i=1 to i=k;

and wherein said sensing elements contacts the surface of the object in a point on said straight line passing through said center of relative rotation and perpendicular to the plane drawn through said axles of said first step.

3. A device for measuring the deviation of objects with nominally circular cross-section from a round shape, particularly for measuring the distance between the center of a profile of the cross-section of the object and the axis about which the object is rotatably mounted, comprising: a base; a displacement transducer secured to said base and including a sensing element for contacting the surface of the object to be measured; a device for visualizing the response of said transducer; a support device mounted on said base and including self-adjusting balance beams mounted to pivot about respective swing axles, arranged in a plurality of support steps, the latter including: at least a first step and a last step, each step except said last step being the preceding step for some other step, and each step except said first step being the subsequent step for some other step; said axles of said first step being directly secured to said base, said axles of each step except said first step being directly secured to respective ends of said beams of said preceding steps, and said beams of said last step having areas for contacting the surface of the object; the disposition of said axles of the first step being determined by central angles defined by radii drawn from a center of relative rotation of the object to said axle of the respective beam of said first step and to the middle of a segment interconnecting said axles of the first step; the disposition of said axles of the subsequent steps on said beams of the preceding steps being determined by central angles defined by radii drawn from said center of relative rotation to said axles of the preceding steps and a respective beam of said subsequent step installed thereon; the disposition of said areas on the beams of said last step, contacting the surface of the object, being determined by central angles defined by radii drawn from said center of relative rotation to said axle of the respective beam of said last step and to the middle of said area situated thereon; said beams being symmetrical relative to a plane passing through their respective axles and said center of relative rotation, and a pair of beams of each step except said first step being symmetrical relative to said plane passing through said axle of the respective beam of said preceding step and said center of relative rotation; all of said central angles being determined on the basis of a condition of minimizing the expression $$P_{xn} = \left| \frac{\cos n\mu_o}{\cos \mu_o} \prod_{i=1}^{i=k} \frac{\cos n\mu_i}{\cos \mu_i} \right|$$

wherein: $P_{xn}$ is a value determining the amplitude of the harmonic n of displacement of the center of the profile of the cross-section of the object in a direction of a straight line passing through said axles of said first step;

n is a serial number of harmonics n=2; 3; 4;

$\mu_o$ is a central angle defined by radii drawn from said center of relative rotation to said axles of one of said beams of the first step and to the middle of a segment interconnecting said axles of the first step;

i is a serial number of the step of self-adjusting balance beams $1 \leq i \leq k$;

$\mu_i$ is a central angle defined by radii drawn from said center of relative rotation to said axles of one of said beams of the step i and one of said beams of the step i+1, mounted thereon, selectively with i=k, to the middle of an area adapted to contact one of said beams of the last step with the surface of the object and said axle of said beams of the last step with the surface of the object and said axle of said one beam of the last step;

is a symbol that stands for the product of cofactors ranging from $i=1$ to $i=k$;

said base being suspended by a pantograph and provided with a flat portion extending parallel to a plane drawn through said axles of said first step; and further comprising an additional transducer including an additional sensing element that contacts said flat portion, for measuring the distance between said center of the profile of the object and said rotational axis, an additional device to visualize the response of said additional transducer, a frame for supporting said pantograph and said additional transducer, and means for supporting the object on said frame, said additional sensing element, which contacts said flat portion, extending on said base at a point on said straight line passing through said center of relative roation and perpendicular to said plane drawn through said axles of said first step, said first-mentioned sensing element for measuring said deviation of the object contacting the surface of the object at a point on said straight line.

4. The device as defined in claim 3, wherein said deviation is measured between said center of the profile of the object relative to the axis passing through said profile center of two other cross-sections of the object, named base cross-sections, wherein said means for rotatably supporting the object consists of two support devices, each consisting of a series of pivotably mounted self-adjusting balance beams mounted to support said object at one of said base cross-sections.

* * * * *